(12) United States Patent
Kato et al.

(10) Patent No.: US 8,719,367 B2
(45) Date of Patent: May 6, 2014

(54) DATA PROCESSING APPARATUS, DISTRIBUTED PROCESSING SYSTEM, DATA PROCESSING METHOD AND DATA PROCESSING PROGRAM

(75) Inventors: Hiroki Kato, Tokyo (JP); Koji Kobayashi, Tokyo (JP); Noritaka Hayama, Tokyo (JP); Kazufumi Oyama, Tokyo (JP); Wataru Onogi, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 613 days.

(21) Appl. No.: 12/593,191

(22) PCT Filed: Oct. 9, 2007

(86) PCT No.: PCT/JP2007/001093
§ 371 (c)(1),
(2), (4) Date: Dec. 22, 2009

(87) PCT Pub. No.: WO2008/120281
PCT Pub. Date: Oct. 9, 2008

(65) Prior Publication Data
US 2010/0095302 A1 Apr. 15, 2010

(30) Foreign Application Priority Data
Mar. 28, 2007 (JP) .................................. 2007-084939

(51) Int. Cl.
*G06F 15/16* (2006.01)
(52) U.S. Cl.
USPC ........................................................ 709/217

(58) Field of Classification Search
USPC ........................................................ 709/217
See application file for complete search history.

(56) References Cited

U.S. PATENT DOCUMENTS

| 6,128,642 | A  | * | 10/2000 | Doraswamy et al. | ......... | 709/201 |
| 6,424,973 | B1 | * | 7/2002  | Baclawski        | ............................. | 1/1 |
| 6,728,748 | B1 | * | 4/2004  | Mangipudi et al. | ............ | 718/105 |
| 6,970,913 | B1 | * | 11/2005 | Albert et al.    | .................. | 709/217 |
| 7,325,040 | B2 | * | 1/2008  | Truong           | .......................... | 709/217 |

(Continued)

FOREIGN PATENT DOCUMENTS

| JP | 2-297632 | 12/1990 |
| JP | 2002-354066 | 12/2002 |
| JP | 2005-267118 | 9/2005 |
| JP | 2006-343996 | 12/2006 |

OTHER PUBLICATIONS

International Search Report dated Dec. 11, 2007, from the corresponding International Application.

(Continued)

*Primary Examiner* — Alicia Baturay
(74) *Attorney, Agent, or Firm* — Katten Muchin Rosenman LLP

(57) ABSTRACT

A terminal includes a task information acquiring unit which acquires information on a task of data processing, and a communication task generator which generates a send task to allow a source apparatus of data required by the task to transmit the data required by the task to an apparatus executing the task and which transmits the send task to the source apparatus, when the source apparatus is another apparatus, which is different from the apparatus executing the task and which is connected to the apparatus executing the task via a network.

15 Claims, 14 Drawing Sheets

(56) References Cited

U.S. PATENT DOCUMENTS

| | | | |
|---|---|---|---|
| 7,406,511 B2* | 7/2008 | Bock et al. | 709/219 |
| 7,702,744 B2* | 4/2010 | Hoshiai et al. | 709/217 |
| 2001/0034845 A1* | 10/2001 | Brunt et al. | 713/201 |
| 2005/0183090 A1 | 8/2005 | Hunt | |
| 2005/0229184 A1 | 10/2005 | Inoue et al. | |
| 2005/0256826 A1 | 11/2005 | Hambrick et al. | |
| 2006/0190575 A1* | 8/2006 | Harvey et al. | 709/222 |
| 2007/0130105 A1* | 6/2007 | Papatla | 707/2 |
| 2007/0156630 A1* | 7/2007 | Steinmaier et al. | 707/1 |
| 2008/0148342 A1* | 6/2008 | Aiyagari et al. | 726/1 |

OTHER PUBLICATIONS

International Preliminary Report on Patentability and Written Opinion of the International Searching Authority dated Oct. 20, 2009, from the corresponding International Application.

Supplementary European Search Report dated Nov. 8, 2011, from corresponding European Application No. 07 82 7872.

F. Curbera, et al. "Colombo: Lightweight Middleware for Service-Oriented Computing" IBM Systems Journal, vol. 44, No. 4, 2005, pp. 799-820.

Notification of Reason(s) for Refusal dated May 15, 2012, from corresponding Japanese Application No. 2007-084939.

Chinese Second Office Action dated Dec. 5, 2012, from corresponding Chinese Application No. 200780052409.6.

Chinese First Office Action dated May 23, 2012, from corresponding Chinese Application No. 200780052409.6.

* cited by examiner

FIG. 3

| TERMINAL ID 102 | PROCESSOR FREQUENCY 104 | PROCESSOR COUNT 106 | MEMORY 108 | PROCESSOR OPERATING RATIO 110 | MEMORY USAGE 112 | DISTRIBUTION DATA AND TIME 114 | DISTRIBUTED TASK ID 116 | DISTRIBUTED TASK AMOUNT 118 | PERFORMED TASK AMOUNT 120 |
|---|---|---|---|---|---|---|---|---|---|
| 0001 | 500MHz | 8 | 256MB | 80% | 65% | 06/05/08 11:50:23 | 0102 | 4000 | 1850 |
| 0002 | 1GHz | 12 | 512MB | 10% | 20% | 06/05/10 21:47:06 | 0103 | 3000 | 1000 |
| .. | .. | .. | .. | .. | .. | .. | .. | .. | .. |

```
<instanceDefinition>

<instance id="senderInstance_A">
    <contract>
      <location>client</location>
      <memory>0x500000</memory>
      <extendedResource>
        <taskset>
          <taskset0 />
        </taskset>
      </extendedResource>
    </contract>
    <sender>
      <name>10</name>
      <name2>20</name2>
    </sender>
  </instance>

<instance id="receiverInstance_A">
    <contract>
      <location>processor1</location>
      <memory>0x500000</memory>
      <generate>every</generate>
      <extendedResource>
        <taskset>
          <taskset0 />
        </taskset>
      </extendedResource>
    </contract>
    <receiver>
      <id>3</id>
      <id2>8</id2>                                  130
      <stream>
        <channelIn1>
          <channelOut1 ref="#senderInstance_A" />
        </channelIn1>
      </stream>
    </receiver>
  </instance>
```

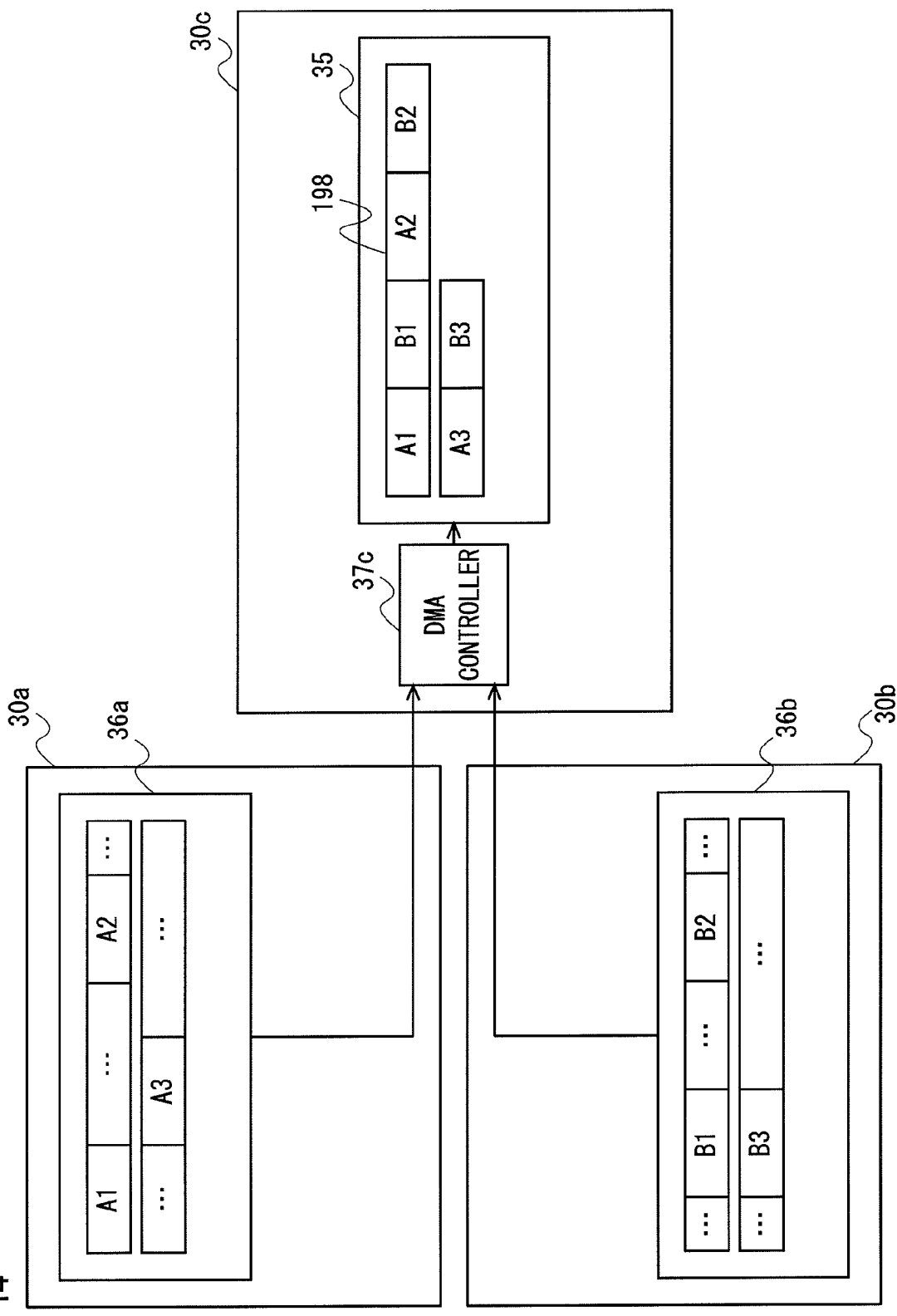

DATA PROCESSING APPARATUS, DISTRIBUTED PROCESSING SYSTEM, DATA PROCESSING METHOD AND DATA PROCESSING PROGRAM

TECHNICAL FIELD

The present invention relates to a distributed processing technology and, more particularly, a data processing apparatus, a distributed processing system, a data processing method, and a data processing program, with which tasks are processed in a distributed manner by a plurality of data processing apparatus interconnected by a network.

BACKGROUND ART

A distributed processing system is known for its capacity to process a large-scale computation requiring a large number of resources by distributing it to a plurality of processors.

DISCLOSURE OF INVENTION

Problems to be Solved by the Invention

Nevertheless, it is generally not easy to divide an application designed primarily to be processed by a single processor into a plurality of modules and have them processed by a plurality of processors in a distributed manner. Also, when designing an application by assuming a distributed processing by a plurality of processors, there are problems of sending and receiving data and the like to be addressed and it is necessary to design a system by even considering which modules are to be processed by which processors. As a result, such a system tends to be lacking in flexibility and versatility.

The present invention has been made in view of the foregoing circumstances, and a general purpose thereof is to provide a distributed processing technology featuring greater convenience.

Means for Solving the Problem

One embodiment of the present invention relates to a data processing apparatus. This data processing apparatus comprises: a task information acquiring unit which acquires information on a task of data processing; and a communication task generator which generates a send task to allow a source apparatus of data required by the task to transmit the data required by the task to an apparatus executing the task and which transmits the send task to the source apparatus, when the source apparatus is another apparatus, which is different from the apparatus executing the task, connected to the apparatus executing the task via a network.

Optional combinations of the aforementioned constituting elements described above, and implementations of the invention in the form of methods, apparatuses, systems and so forth may also be effective as additional modes of the present invention.

Advantageous Effects

The present invention provides a distributed processing technology featuring greater convenience.

BRIEF DESCRIPTION OF THE DRAWINGS

FIG. 3 shows an example of internal data of a resource database.

FIG. 4 shows an example of an XML document describing information on an application.

FIG. 14 is an illustration for explaining how the input data for a core task are generated when tasks have been distributed as shown in FIG. 13.

EXPLANATION OF REFERENCE NUMERALS

20 Distributed processing system, 12 Network, 20 Terminal, 21 Communication unit, 22 MPU, 24 Input/output unit, 26 Processor, 28 Local memory, 30 Processing unit, 32 Processor, 34 Local memory, 42 Main memory, 46 Network control unit, 50 Control unit, 51 Task acquiring unit, 52 Task executing unit, 53 Receive task executing unit, 54 Send task executing unit, 55 Task information acquiring unit, 56 Communication task generator, 60 Control unit, 65 Process managing unit, 66 Execution status managing unit, 68 Task queue, 80 Distributed processing management apparatus, 84 Resource database, 90 Control unit, 91 Processing capacity information acquiring unit, 92 Application information acquiring unit, 93 Task distributing unit, 94 Communication task generator, 95 Task transmitting unit, 96 Execution status managing unit, 97 Task information conveying unit.

BEST MODE FOR CARRYING OUT THE INVENTION (First Embodiment)

Figure 1:
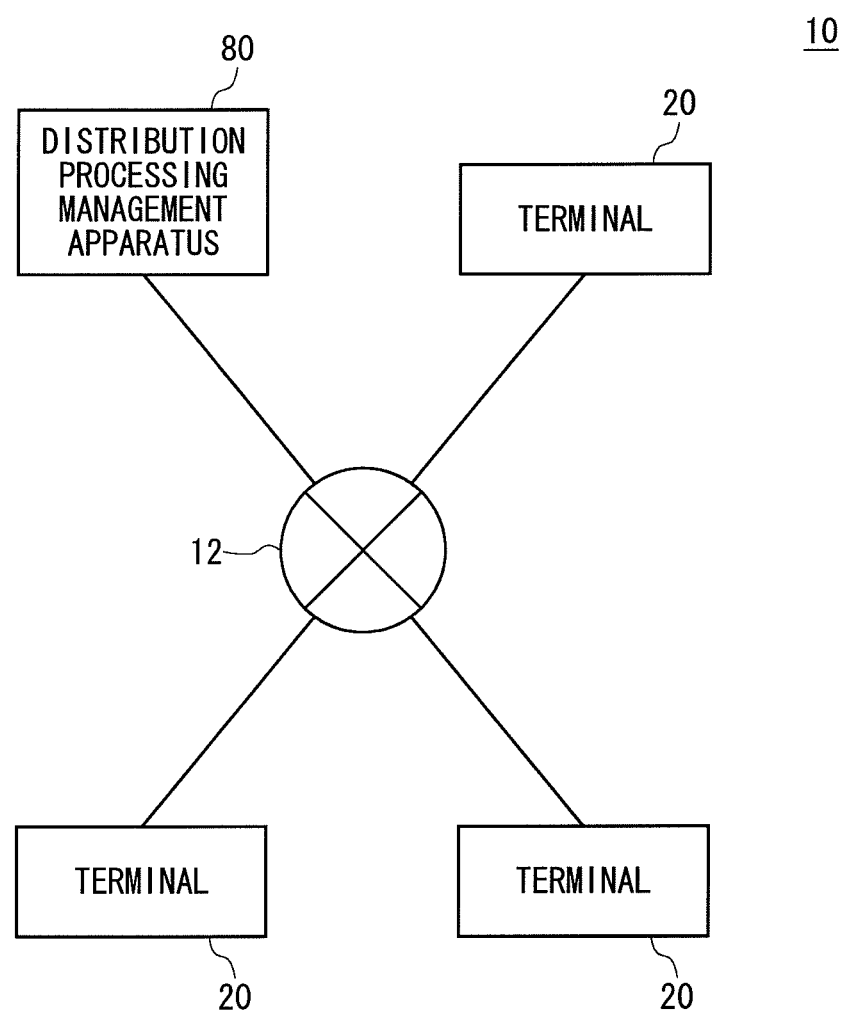
FIG. 1 shows a constitution of a distributed processing system according to a first embodiment.

FIG. 1 shows a constitution of a distributed processing system 10 according to a first embodiment. The distributed processing system 10 includes a distributed processing management apparatus 80 and a plurality of terminals 20. These apparatuses, which are examples of data processing apparatuses, are interconnected by a network 12 such as the Internet or LAN. In a distributed processing of an application by a plurality of terminals 20, the distributed processing management apparatus 80 manages the execution of processings distributed among the plurality of terminals 20.

Figure 2:
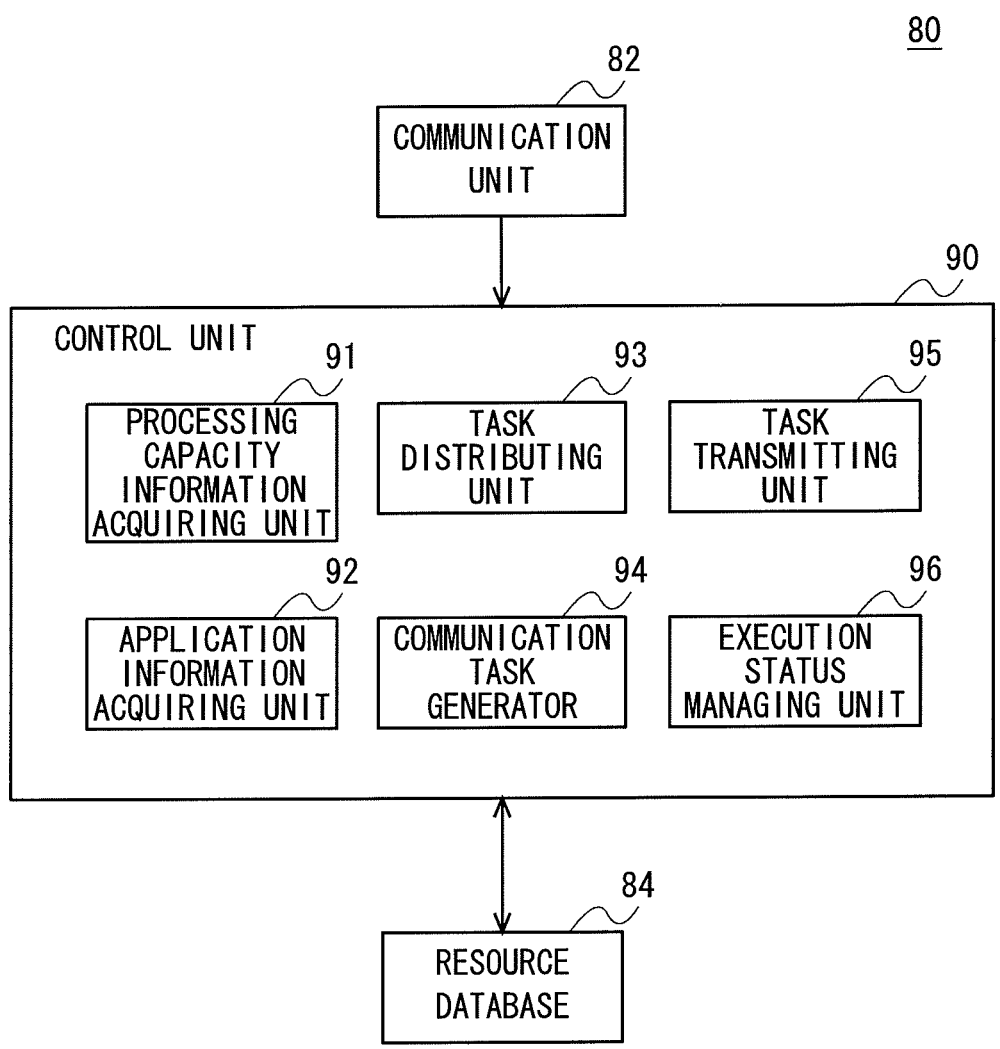
FIG. 2 shows a constitution of a distributed processing management apparatus.

FIG. 2 shows a constitution of a distributed processing management apparatus 80. The distributed processing management apparatus 80 includes a communication unit 82, a control unit 90, and a resource database 84. The control unit 90 includes a processing capacity information acquiring unit 91, an application information acquiring unit 92, a task distributing unit 93, a task transmitting unit 95, and an execution status managing unit 96. In terms of hardware components, these constitutions may be realized by a CPU and memory of an arbitrary computer and memory-loaded programs and the like. Depicted herein are functional blocks realized by cooperation of those. Therefore, it will be understood by those skilled in the art that the functional blocks may be achieved by a variety of manners including hardware only, software only or a combination of both.

The processing capacity information acquiring unit 91 acquires information on the respective processing capacities of a plurality of terminals 20 from the plurality of terminals 20 via the network 12. The processing capacity information acquiring unit 91 acquires processor types, operation clock frequencies, memory capacities, and the like used by the terminals 20 respectively. Also, the processing capacity information acquiring unit 91 acquires information on the current operating ratio of processors, usage of memories and the like from each of the terminals 20 at predetermined timing. If the terminals 20 are all of the same structure, the processing capacity information acquiring unit 91 may acquire the number of processors 32 which are not performing tasks, that is, available for use, as the availability ratio of processors. The processing capacity information acquiring unit 91 registers the acquired information in the resource database 84.

FIG. 3 shows an example of internal data of the resource database 84. Provided within the resource database 84 are a terminal ID column 102, a processor frequency column 104, a processor count column 106, a memory column 108, a processor operating ratio column 110, a memory usage column 112, a distribution date and time column 114, a distributed task ID column 116, a distributed task amount column 118, and a performed task amount column 120. The terminal ID column 102 stores the IDs of terminals 20. The processor frequency column 104 stores the operating frequencies of processors carried by the terminals 20. The processor count column 106 stores the numbers of processors carried by the terminals 20. The memory column 108 stores the memory capacities of the terminals 20. The processor operating ratio column 110 stores the operating ratios of processors of the terminals 20. The memory usage column 112 stores the usages of memories of the terminals 20. The distribution date and time column 114 stores the dates and times of distribution of tasks to the terminals 20. The distributed task ID column 116 stores the IDs of tasks distributed to the terminals 20. The distributed task amount column 118 stores the amounts of tasks distributed to the terminals 20. The performed task amount column 120 stores the amounts of tasks already performed by the terminals 20.

The application information acquiring unit 92 acquires information on an application which includes a plurality of tasks to be processed by the terminals 20. In the present embodiment, the application information acquiring unit 92 acquires information on an application by obtaining an XML document describing the execution sequence of a plurality of tasks contained therein and the information on the transfer of data between the tasks thereof and parsing the XML document.

The task distributing unit 93 determines which of the plurality of tasks contained in the application described in the XML document as acquired by the application information acquiring unit 92 are to be processed by which of the terminals 20, based on the information on the respective processing capacities of the terminals 20 acquired by the processing capacity information acquiring unit 91. For example, when a first task requires two processors and a second task requires three processors and if there is one of the terminals 20 whose five processors are available for use at the time, then all the tasks may be distributed to the same terminal 20. However, if there is none of the terminals 20 which can execute all the tasks, the task distributing unit 93 distributes the tasks to a plurality of terminals 20. In such a case, the application information acquiring unit 92 and the task distributing unit 93 take charge of the function of a task information acquiring unit that acquires information on the tasks.

When a plurality of tasks are distributed to a plurality of terminals 20 and transfer of data for executing the tasks is required therebetween, a communication task generator 94 generates communication tasks for the transfer of data therebetween via the network 12 and adds them to the tasks to be transmitted to the terminals 20. Added to a task to be transmitted to a data-sender terminal 20 is a send task which sends the output data outputted from the task to an apparatus executing a subsequent task. Added to a task to be transmitted to a data-receiver terminal 20 is a receive task which generates input data by converting the data received from a source apparatus of data required by the task into a data format compatible with the input interface of the task. Communication parameters are set in advance for these communication tasks according to the processing capacity of the source of data required by the task, namely, a sender terminal 20, and that of the apparatus executing a subsequent task, namely, a receiver terminal 20. The communication parameters may also be set according to the transmission speed of the terminals 20, the buffer capacity, or the type of network connecting the terminals 20, for instance. Also, the communication parameters may be set according to the contents of data required by the tasks. The communication parameters may, for instance, include information for selecting data to be sent by a sender terminal 20, information for generating input data by selecting, converting or merging data from among the data received by a receiver terminal 20, and the like. Also, the communication parameters may include information concerning the timing with which input data are to be inputted. Information concerning data required by the tasks may be described in an XML document to be acquired by the application information acquiring unit 92.

The task transmitting unit 95 transmits tasks distributed by the task distributing unit 93 to terminals 20 via the network 12. The execution status managing unit 96 manages the execution status of tasks at the terminals 20 by acquiring the execution status of tasks from each of the terminals 20 to which tasks have been distributed and recording it in the resource database 84. If necessary, the task transmitting unit 95 instructs the task distributing unit 93 to redistribute the tasks.

FIG. 4 shows an example of an XML document describing information on an application. In the example shown in FIG. 4, there is a description of information on two tasks contained in the application, namely, "senderInstance_A" and "receiverInstance_A". In the part where information on the second task "receiverInstance_A" is described, data to be inputted to the second task is declared in the <stream> element 130. Here, it is declared in the <channelIn1> element that data described in the <channelOut1> element be inputted to the second task. In the <channelOut1> element, the source of data is described as the data outputted from the first task "senderInstance_A". That is, it is shown that data outputted from the first task must be inputted to the second task.

Figure 5:
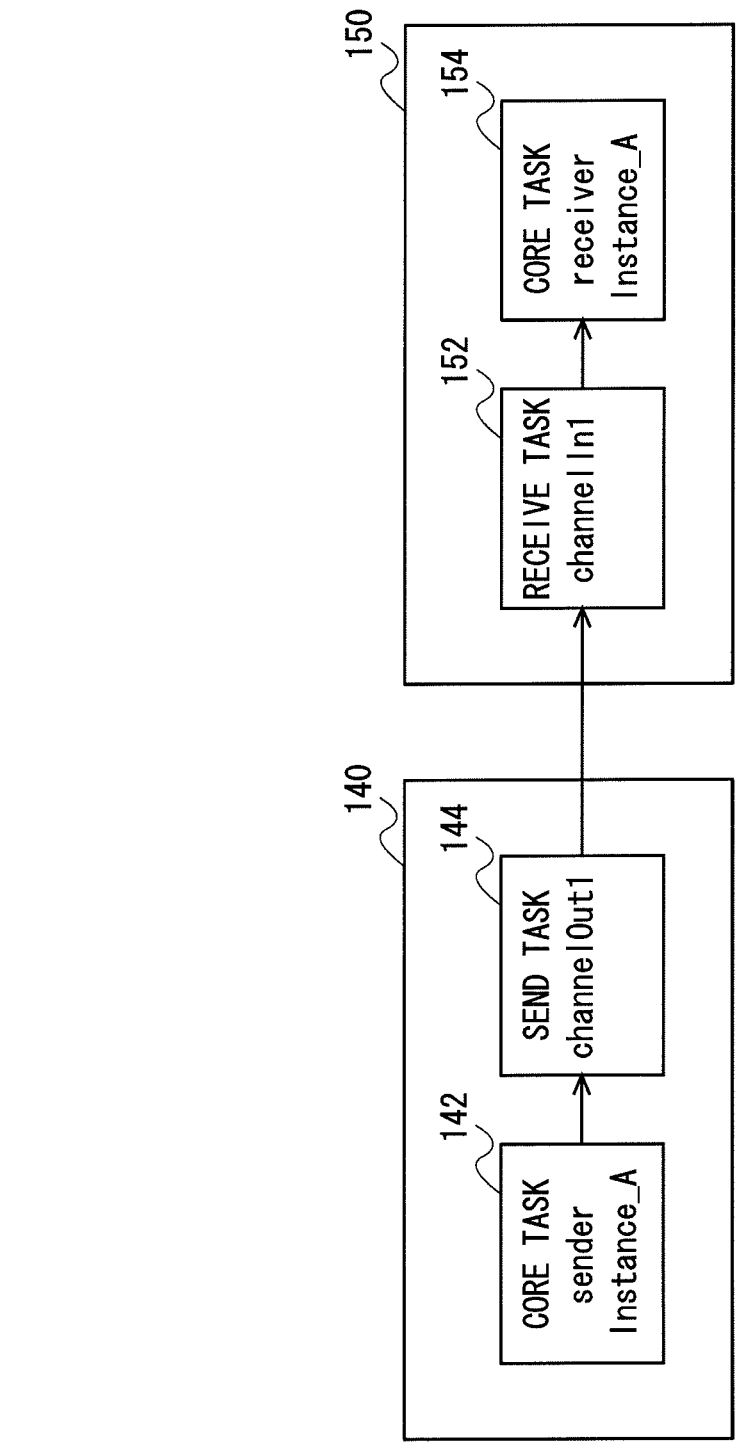
FIG. 5 shows a relationship between the tasks as described in an XML document shown in FIG. 4.

FIG. 5 shows a relationship between the tasks as described in an XML document shown in FIG. 4. Hereinbelow, a task constituting an application is referred to as "core task" so that it can be distinguished from a communication task which is generated by the communication task generator 94. Firstly, as a first core task 142 is executed, the data outputted from the first core task 142 is inputted to a second core task 154 and the second core task 154 is executed. In this example, the data outputted from the first core task 142 must be inputted to the second core task 154, and therefore in the case where the task distributing unit 93 distributes the first core task 142 and the second core task 154 to different terminals 20, the communication task generator 94 adds a send task 144 to the first core task 142 to enable the transmission of the data outputted from the first core task 142 to the terminal 20 to which the second core task 154 is distributed. It also adds a receive task 152 to the second core task 154 to enable the generation of input data of the second core task 154 by receiving data transmitted from the terminal 20 to which the first core task 142 is distributed. The task transmitting unit 95 transmits the first task 140 and the second task added with the respective communication tasks to the terminals 20 to which they are distributed respectively.

Figure 6:
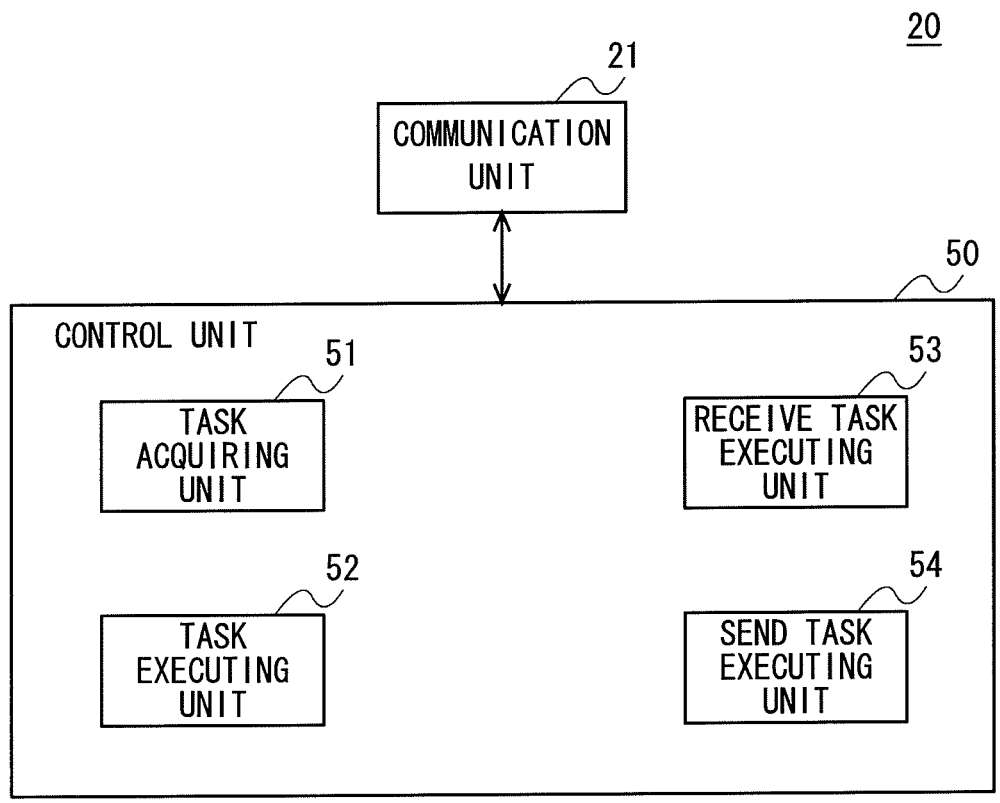
FIG. 6 shows a constitution of a terminal.

FIG. 6 shows a constitution of a terminal 20. The terminal 20 includes a communication unit 21 and a control unit 50. The control unit 50 includes a task acquiring unit 51, a task executing unit 52, a receive task executing unit 53, and a send task executing unit 54. And it is evident to those skilled in the art that these function blocks can be realized in a variety of forms such as by hardware only, software only or the combination thereof.

The task acquiring unit 51 acquires a task or tasks from the distributed processing management apparatus 80 via the network 12. The task executing unit 52 executes the task or tasks thus acquired. The task executing unit 52, as will be described later, accomplishes its function by a plurality of processors equipped in the terminal 20 and local memories provided in those processors. The receive task executing unit 53 executes a receive task when the task acquired has the receive task added thereto, and transfers input data, which is generated from the data received from a source apparatus of data required by the task, to the task executing unit 52. The receive task executing unit 53, as will be described later, transfers the input data to the input buffers of local memories. The send task executing unit 54 executes a send task when the task acquired has the send task added thereto, and transmits necessary data selected from output data stored in the output buffers of local memories to an apparatus which will execute a subsequent task.

Figure 7:
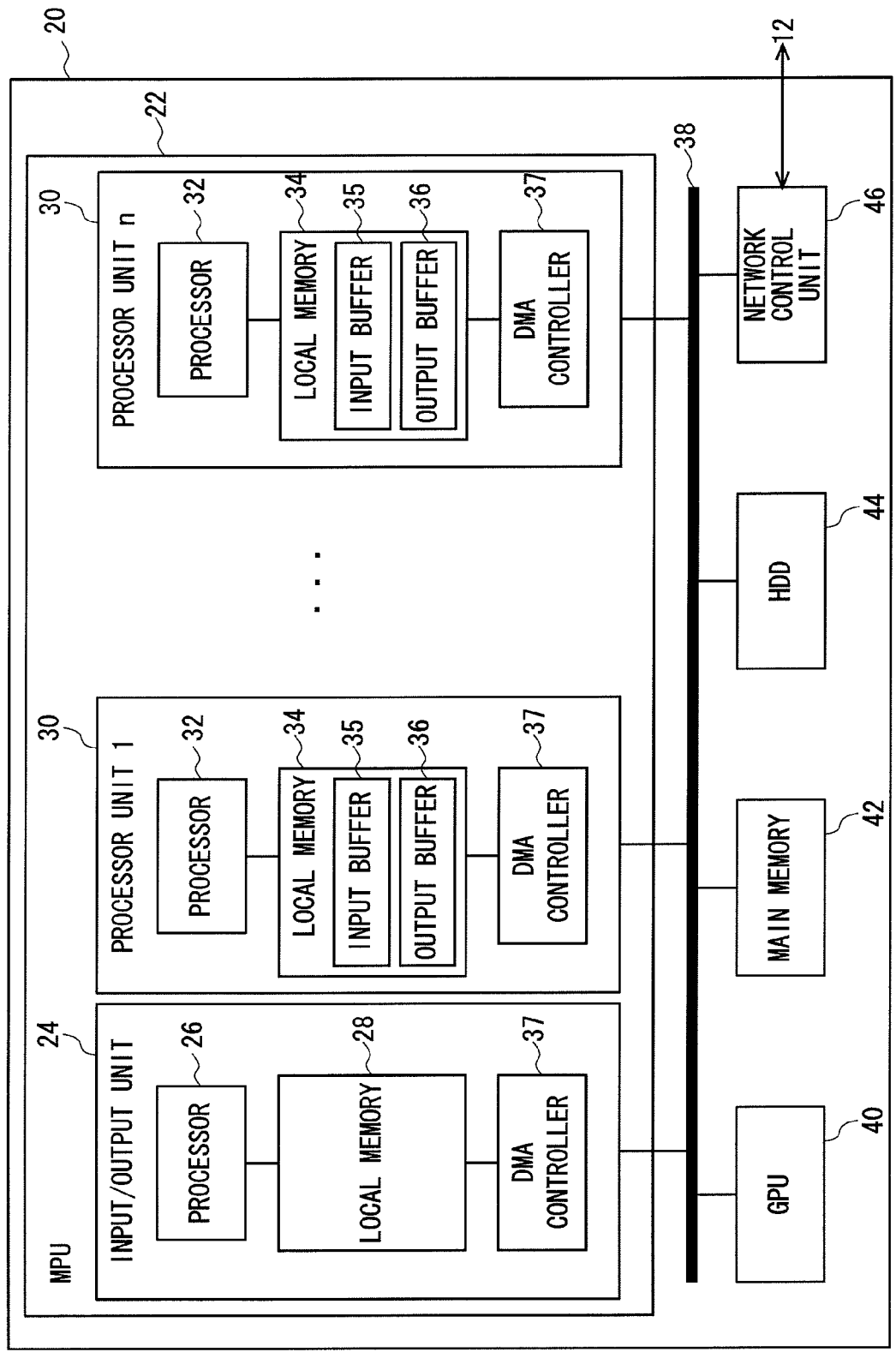
FIG. 7 shows a hardware structure of a terminal.

FIG. 7 shows a hardware structure of a terminal 20. The terminal 20 includes a microprocessor unit (MPU) 22, a graphics processing unit (GPU) 40, a main memory 42, an auxiliary storage device (HDD) 44, and a network control unit 46, which are connected to one another via a main bus 38. The network control unit 46 exchanges data with the other terminals 20, the distributed processing management apparatus 80 and the like via a network 12.

The MPU 22, which is an asymmetrical multiprocessor unit, has an input/output unit 24 and a plurality of processing units 30, which represent an example of a task executing unit 52. The input/output unit 24, which performs inputs and outputs of data to and from the other constituent units, includes a processor 26 and a local memory 28. The local memory 28 is, for instance, a cache memory. Each of the processing units 30 is a unit for independently executing a task contained in an application and includes a processor 32 and a local memory 34. A program, data, operation parameters and the like read out from the main memory 42 are written to the local memory 34 and executed by the processor 32.

The input/output unit 24 transmits and receives data to and from the other constituent units within the terminal 20, such as the GPU 40, the main memory 42, the HDD 44 and the network control unit 46, via the main bus 38. Also, it transmits and receives data to and from the other apparatuses via the network control unit 46. According to the present embodiment, the processing unit 30 can perform the transmission and reception of data to and from the other processing units 30, the input/output unit 24, the GPU 40 and the main memory 42, but cannot perform the direct transmission and reception of data to and from the other apparatuses via the network control unit 46. The processing unit 30 transmits and receives data to and from the other apparatuses via the input/output unit 24.

In another embodiment, the arrangement may be such that the processing unit 30 can also perform the direct transmission and reception of data to and from the other apparatuses. Also, the MPU 22 may be a symmetrical multiprocessor unit, and in such a case, any one of the processing units 30 may perform the function of the input/output unit 24, and all the processing units 30 may perform the direct transmission and reception of data to and from the other apparatuses.

The tasks distributed to the terminal 20 are executed by at least some of the plurality of processing units 30 under the management of the process management function executed by the input/output unit 24. The input/output unit 24 selects the processing units 30 available for use from among the plurality of processing units 30 and has them execute the tasks.

Figure 8:
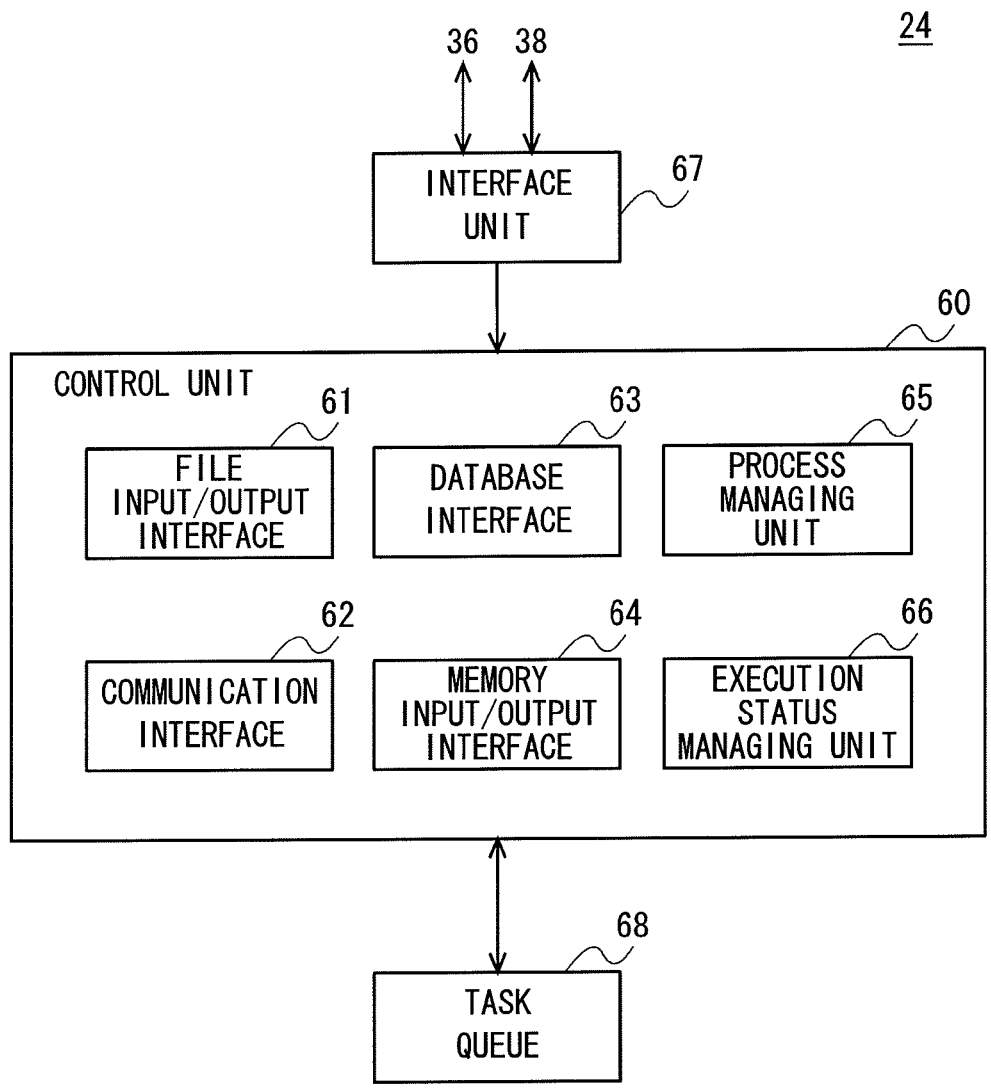
FIG. 8 shows a functional constitution of an input/output unit.

FIG. 8 shows a functional constitution of an input/output unit 24. The input/output unit 24 includes an interface unit 67, a control unit 60, and a task queue 68. The control unit 60 includes a file input/output interface 61, a communication interface 62, a database interface 63, a memory input/output interface 64, a process managing unit 65, and an execution status managing unit 66.

The interface unit 67 transmits and receives data via the main bus 38. The file input/output interface 61 inputs and outputs a file stored in the HDD 44 for instance. The communication interface 62 inputs and outputs data to and from the other apparatus via the network control unit 46 for instance. The database interface 63 inputs and outputs data to and from a database stored in the HDD 44 or loaded in the main memory 42 for instance. The memory input/output interface 64 inputs and outputs data on the main memory 42 for instance.

The process managing unit 65 manages processes executed by the processing units 30. Tasks to be executed by the processing units 30 are successively stored in the task queue 68. As a processor 32 in the processing unit 30 becomes ready for executing a next task, the next task is obtained by referencing the task queue 68 and executed. The process managing unit 65 manages whether the respective processor 32 of the processing unit 30 is executing the task or not and reports it to the distributed processing management apparatus 80.

The execution status managing unit 66 manages the execution status when the processors 32 of the processing units 30 execute the tasks of an application distributed among the terminals 20. When, for instance, tasks to be executed by the processing units 30 are excessively loaded into the task queue 68 and thus the distributed tasks of an application cannot be executed immediately, the execution status managing unit 66 reports the situation to the distributed processing management apparatus 80, requesting it to redistribute the tasks to the other terminals 20.

The process management function may be executed by each of the processing units 30. In such a case, the process management function of each processing units 30 obtains a task to be executed from the task queue and executes it when the processing unit 30 becomes ready to execute another task. In this manner, tasks are executed by the processing units 30, and hence it is preferable that the tasks to be distributed to the terminals 20 are designed as programs to be executed by the processing units 30. Also, it is preferable that tasks are so designed as to be executable within the processing capacity of a single terminal 20.

(Second Embodiment)

In the first embodiment, communication tasks are generated automatically as needed when the distributed processing management apparatus 80 distributes tasks constituting an application to a plurality of terminals 20. In a second embodiment, however, the communication tasks are generated by each terminal 20 to which the tasks are distributed.

Figure 9:
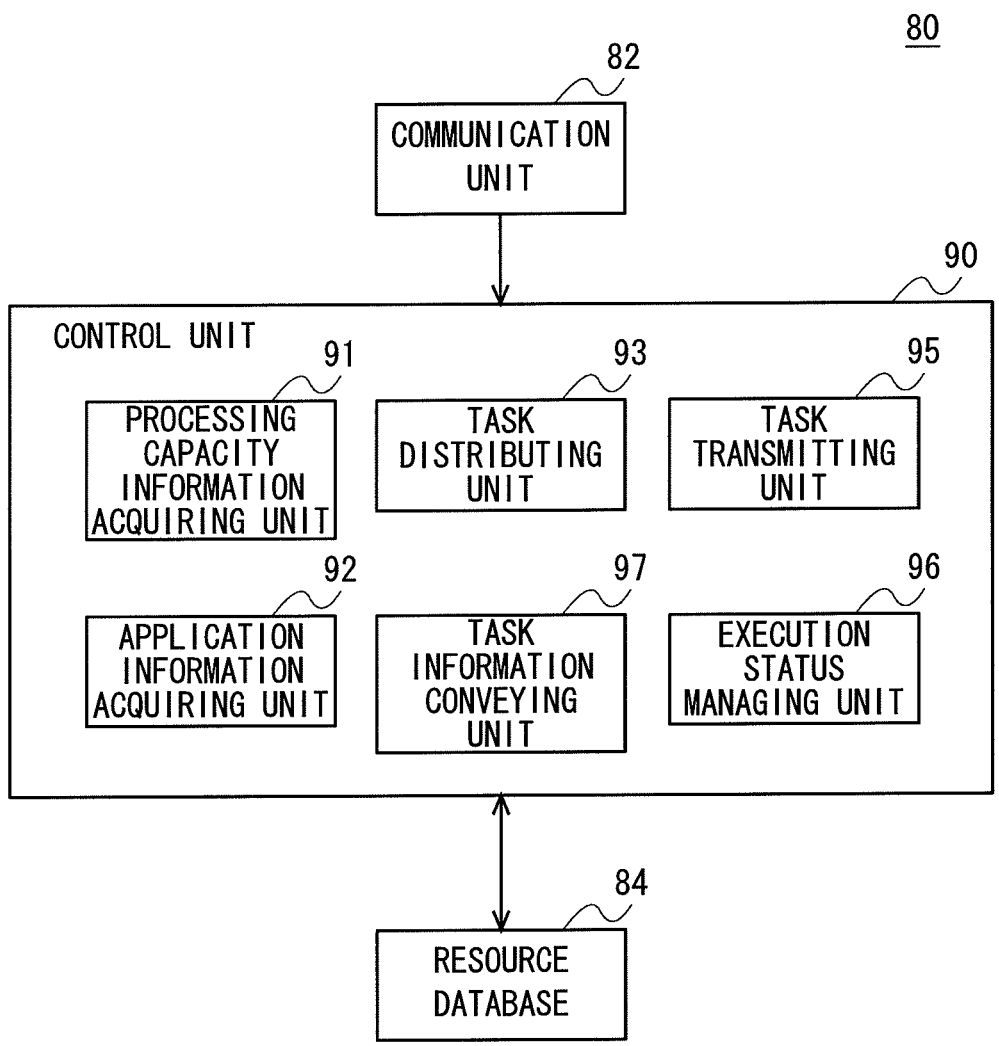
FIG. 9 shows a constitution of a distributed processing management apparatus according to a second embodiment.

FIG. 9 shows a constitution of a distributed processing management apparatus 80 according to the second embodiment of the invention. The distributed processing management apparatus 80 according to the second embodiment differs from the distributed processing management apparatus 80 according to the first embodiment as shown in FIG. 2 in that it includes a task information conveying unit 97 instead of the communication task generator 94. Otherwise, the constitution and operation thereof are the same as those of the first embodiment.

The task information conveying unit 97 conveys information concerning source apparatus of data required by tasks to terminals 20 to which the tasks have been distributed. Thereupon, the terminal 20 itself can generate a send task to obtain data from a source apparatus and transmit it to the source apparatus. The task information conveying unit 97 may also convey additional information concerning the content of data required by the task. For example, it may convey conditions, such as data type, data length and input timing, of input data of the task.

Figure 10:
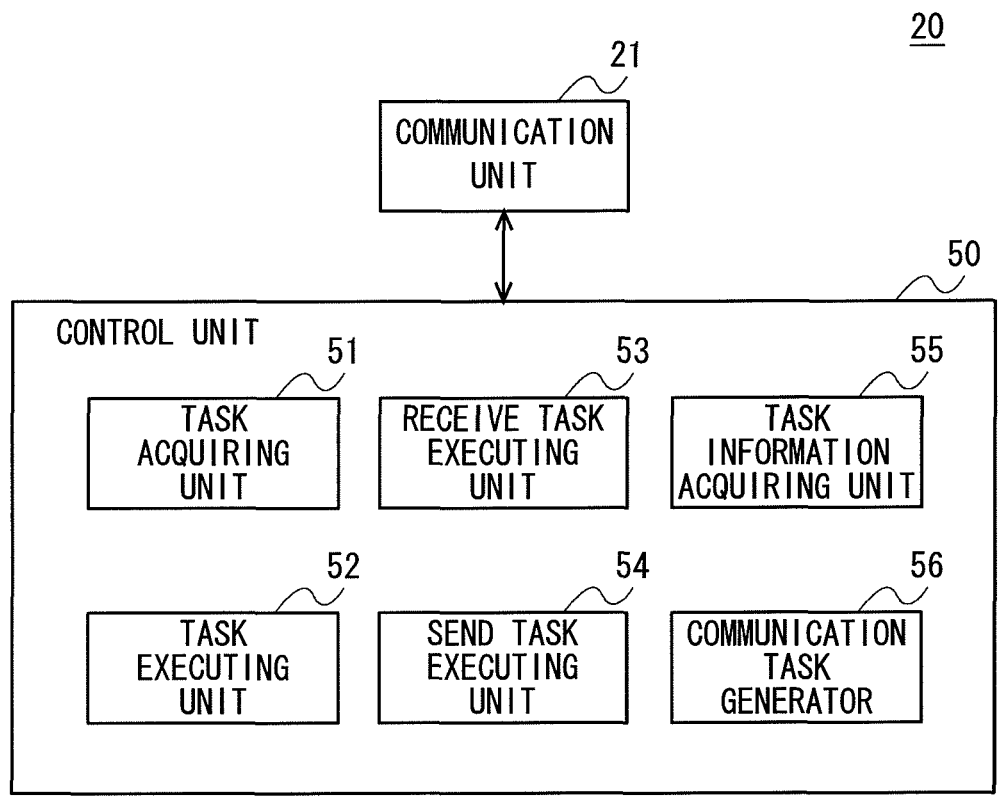
FIG. 10 shows a constitution of a terminal according to a second embodiment.

FIG. 10 shows a constitution of a terminal 20 according to the second embodiment. The terminal 20 according to the second embodiment differs from the terminal 20 according to the first embodiment as shown in FIG. 6 in that it further includes a task information acquiring unit 55 and a communication task generator 56. Otherwise, the constitution and operation thereof are the same as those of the first embodiment.

The task information acquiring unit 55 acquires information on a task of data processing. The task information acquiring unit 55 acquires information on a source of data required by the task which has been acquired by the task acquiring unit 51. When the source of data required by the acquired task is another terminal connected to its own terminal via a network, the communication task generator 56 generates a send task to allow the source terminal to transmit data required by the task to its own terminal and transmits it to the source terminal. Also, the communication task generator 56 generates a receive task to generate input data of the task by receiving data from the source terminal and transmits it to the receive task executing unit 53.

Figure 11:
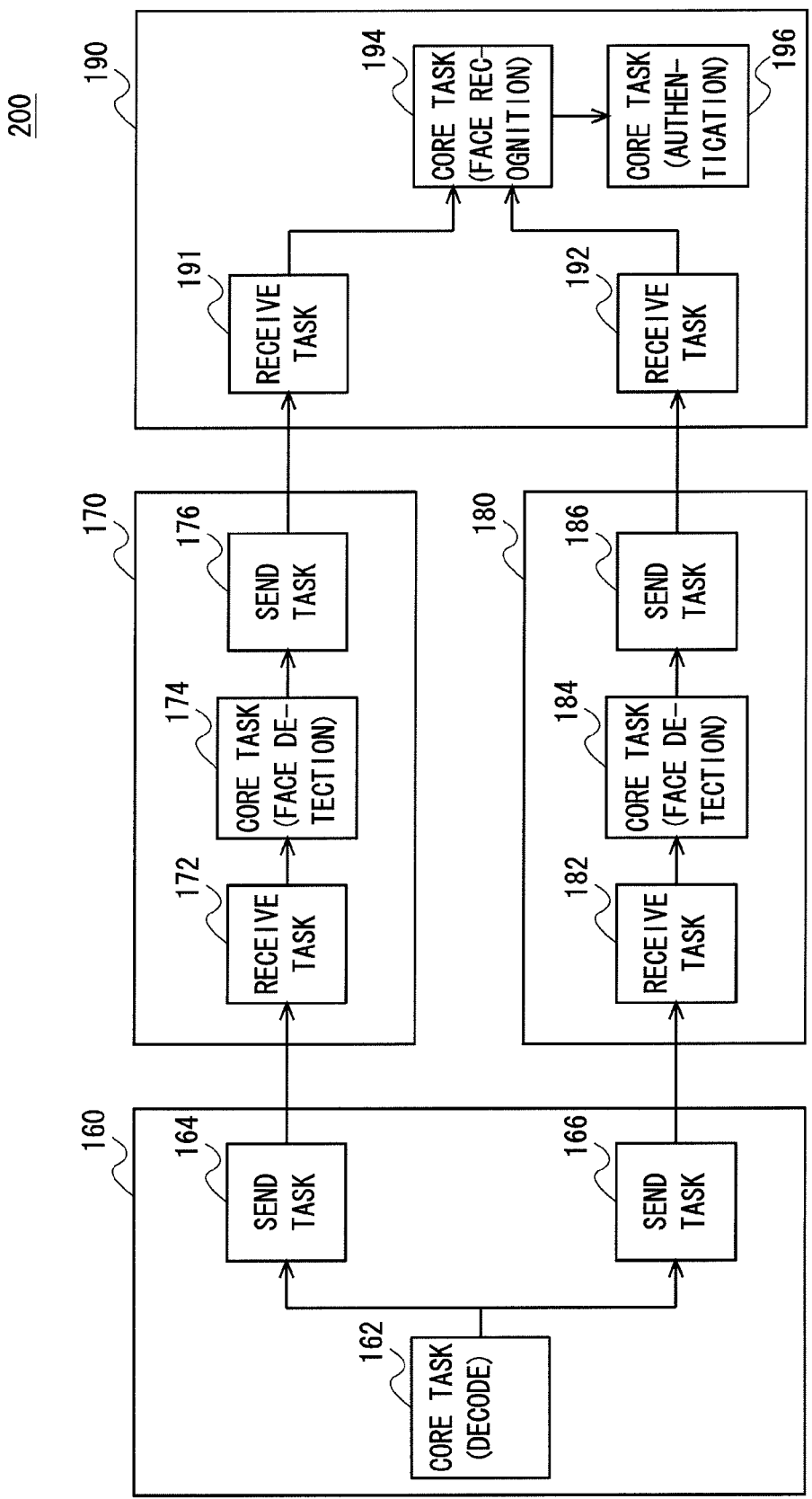
FIG. 11 shows an example of an application.

FIG. 11 shows an example of an application. An application 200, which is an application for authenticating a person by detecting his/her face from moving images, includes a core task 162 which decodes moving images, core tasks 174 and 184 which detect a person's face from within the decoded moving images, a core task 194 which recognizes an image of the detected face, and a core task 196 which authenticates the person by checking the recognized face against a database. Note that the task for detecting a face is divided into the core task 174 for detecting a face from the upper half of a moving image and the core task 184 for detecting a face from the lower half of the moving image.

In the example of FIG. 11, the tasks contained in the application 200 are distributed to a plurality of different terminals. To be more specific, the core task 162 is distributed to a terminal 160, the core task 174 to a terminal 170, the core task 184 to a terminal 180, and the core tasks 194 and 196 to a terminal 190.

The task information conveying unit 97 in the distributed processing management apparatus 80 conveys a message to the terminal 170 to which the core task 174 has been distributed that moving image data necessary for the detection of a face will be outputted from the terminal 160. Also, since the core task 174 is required to process the upper half only of the moving image, it conveys a message that it is required to acquire the upper half only of the moving image out of the data outputted from the core task 162. The communication task generator 56 of the terminal 170 generates a send task 164 for sending data, outputted by the core task 162 to be executed by the terminal 160, to the terminal 170 and transmits it to the terminal 160. To be set beforehand in this send task 164 are communication parameters indicating that data of the upper half of a moving image are to be selected from among the data outputted from the core task 162 based on the information conveyed from the task information conveying unit 97. Also, the communication task generator 56 generates a receive task 172 for generating input data to be inputted to the core task 174 by receiving data from the terminal 160. Similarly, the communication task generator 56 of the terminal 180 generates a send task 166 and transmits it to the terminal 160 and at the same time generates a receive task 182. The send task 164 selects data on the upper half of a moving image from the output buffer of the core task 162 based on the set communication parameters and transmits it to the receive task 172. Similarly, the send task 166 selects data on the lower half of the moving image and transmits it to the receive task 182.

The core task 194 requires both of the data from the terminal 170 which executes the core task 174 and the data from the terminal 180 which executes the core task 184, and therefore a send task 176 and a send task 186 to enable data transmission from the respective terminals are generated and transmitted to the respective terminals. Also, a receive task 191 and a receive task 192 are generated to generate input data by merging the data received from the send task 176 and send task 186. The receive task 191 and receive task 192 may generate input data for the core task 194 by selecting necessary data from among the data received from the terminals 170 and 180. Also, the receive task 191 and receive task 192 may adjust the timing for inputting input data generated from the data received from the terminals 170 and 180 to the core task 194. For example, since the core task 194 requires both results of the core task 174 and the core task 184, the receive task 191 and the receive task 192 may be put on standby until both of the output data are received when only one of the output data has been received. It is also to be noted that the receive task 191 and the receive task 192 may be combined into one receive task.

The core task 194 and the core task 196 are distributed to the same terminal 190, so that data transfer between these tasks does not require communication over a network. Accordingly, there is no generation of a send task and a receive task. In this case, the communication task generator 56 generates a DMA command for selecting data required by the core task 196 from among the data outputted by the core task 194 and, if necessary, converting it into an appropriate data type, rearranging the order of the data or merging it with the data outputted by another core task, and transferring the data to the input buffer 35 of a processing unit 30 executing the core task 196, based on the information conveyed from the task information conveying unit 97. As the core task 194 is executed and the output data are stored in the output buffer 36, the DMA command generated by the communication task generator 56 is executed by a DMA controller 37 of the processing unit 30 by which the core task 194 has been executed or the processing unit 30 by which the core task 196 will be executed, and the input data for the core task 196 is set in the input buffer 35.

Figure 12:
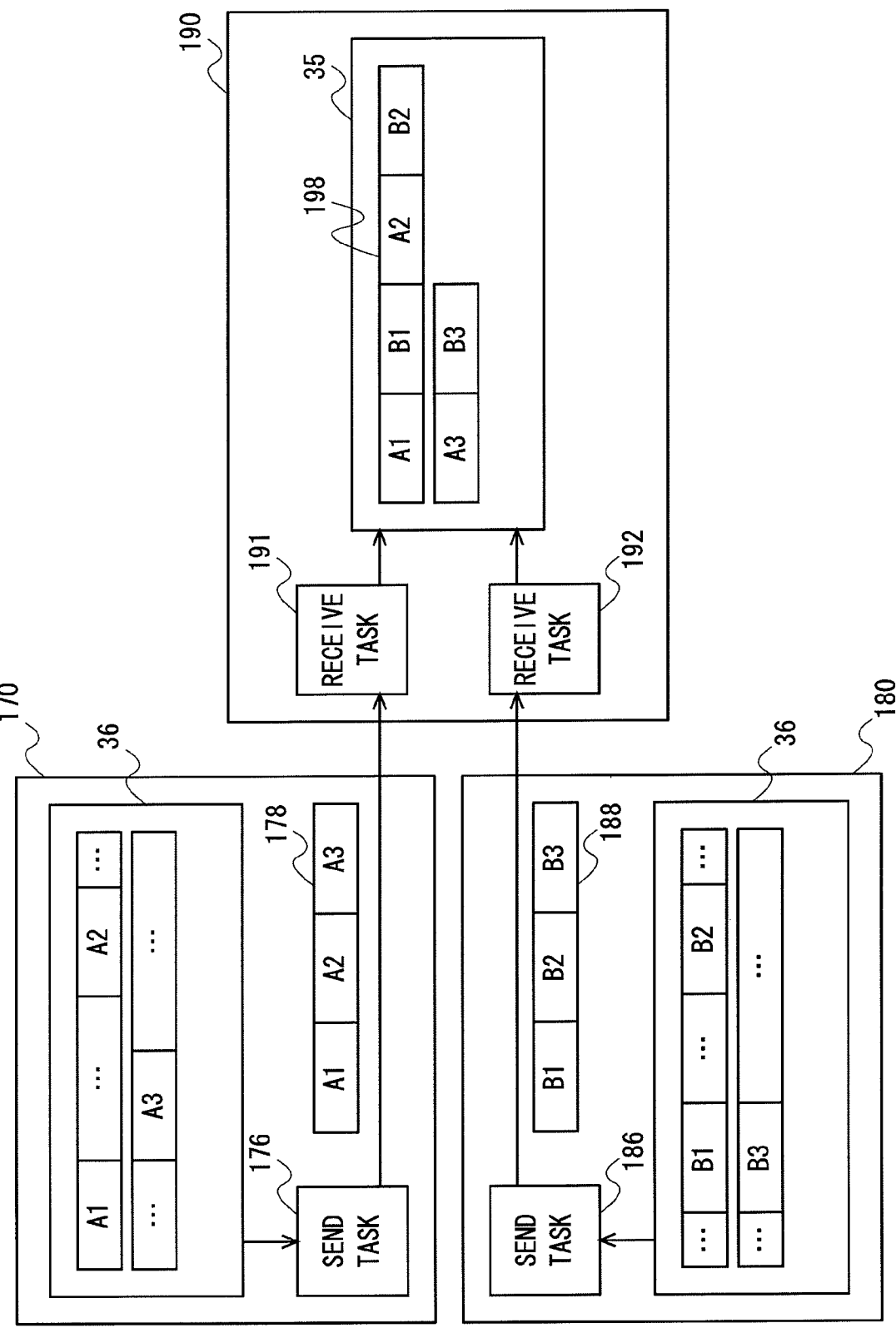
FIG. 12 is an illustration for explaining how the input data for a core task are generated when tasks have been distributed as shown in FIG. 11.

FIG. 12 is an illustration for explaining how the input data for the core task 194 are generated when tasks have been distributed as shown in FIG. 11. As the core task 174 is executed in the terminal 170, the output data are stored in the output buffer 36 of the processing unit 30 by which the core task 174 has been executed. Since communication parameters containing information for the selection of data required by the core task 194 from among the output data stored in the output buffer 36 are set beforehand in the send task 176, the send task 176 generates a send data 178 by selecting necessary data and transmits it to the terminal 190 to which the core task 194 is distributed. Similarly, the send task 186 generates a send data 188 by selecting data required by the core task 194 from among the output data stored in the output buffer 36 and transmits it to the terminal 190. The output data outputted from the core task 174 or 184 may be transferred from the output buffer 36 to the main memory 42. In such a case, the send task 176 or 186 may generate send data 178 or 188 by selecting necessary data from among the data stored in the main memory 42.

Upon receiving the send data 178 and 188 from the terminals 170 and 180 respectively, the receive tasks 191 and 192 to be executed at the terminal 190 convert them into a data type compatible with the input interface of the core task 194, merge those data, and store the input data 198 in the input buffer 35 of the processing unit 30 which will execute the core task 194. At this time, if necessary, the timing is adjusted with which the input data for the core task 194 are transferred to the input buffer 35. For instance, when the input buffer 35 does not have a capacity to store all the input data, the subsequent input data are transferred to the input buffer 35 in such a manner as to overwrite the data no longer necessary according to the progress of the core task 194. In such a case, the receive tasks 191 and 192 may store the received send data 178 and 188 temporarily in the main memory 42 or the like.

Figure 13:
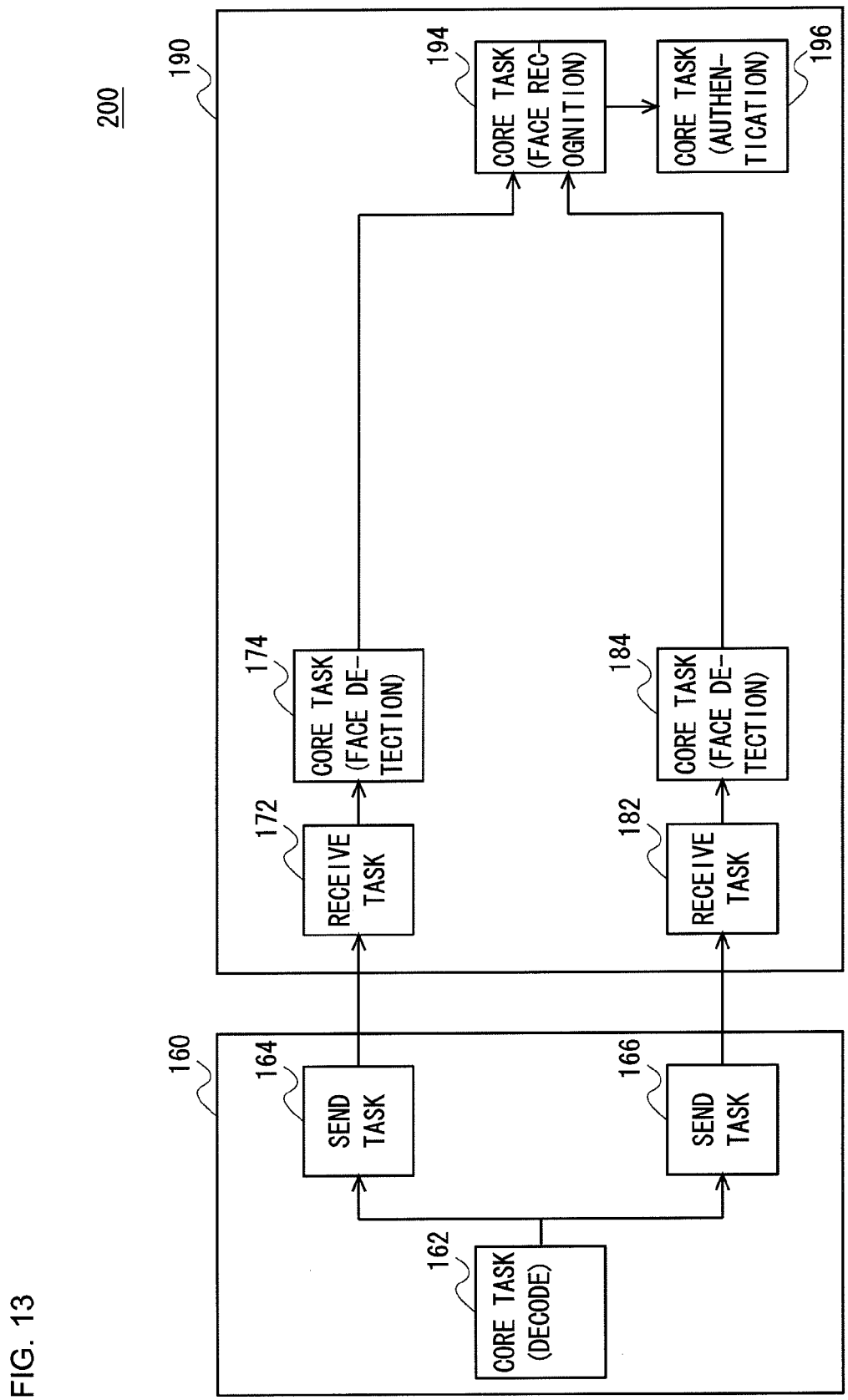
FIG. 13 shows another example of distribution of tasks contained in an application as shown in FIG. 11.

FIG. 13 shows another example of distribution of tasks contained in an application as shown in FIG. 11. In the example of FIG. 13, core tasks 174, 184, 194 and 196 are distributed to the same terminal 190. In this case, transfer of data between the core tasks 174 and 184 and the core task 194 does not require any inter-terminal communication, so that there is no generation of the send tasks 176 and 186 and the receive tasks 191 and 192.

FIG. 14 is an illustration for explaining how the input data for the core task 194 is generated when tasks have been distributed as shown in FIG. 13. A processing unit 30*a* by which the core task 174 is executed, a processing unit 30*b* by which the core task 184 is executed, and a processing unit 30*c* by which the core task 194 is executed are all located within the same terminal 190. Accordingly, the processing unit 30*c* can acquire data by directly accessing an output buffer 36*a* of the processing unit 30*a* where the output data of the core task 184 are stored and an output buffer 36*b* of the processing unit 30*b* where the output data of the core task 194 are stored. In such a case, therefore, there is no generation of any send task or receive task. Instead, the communication task generator 56 generates a list of DMA commands to select data required by the core task 194 from among the data stored in the output buffer 36*a* and 36*b* and transfer them to the input buffer 35*c*.

The DMA controller 37*c* executes the generated DMA command and thereby stores the input data 198 for the core task 194 in the input buffer 35*c*.

As described above, whether a plurality of tasks contained in an application are distributed to the same terminal 20 or to a plurality of different terminals 20, communication tasks or DMA commands necessary for the input and output of data are generated automatically, which assures proper transfer of data. Therefore, the designer of an application can design it without giving consideration to how tasks will be distributed among terminals 20. As a result, the present embodiment can offer an environment in which a large-scale application can be developed easily. Moreover, once an environment for execution is ready with the acquisition of input data, each task can perform its execution irrespective of and asynchronously with the other tasks, which enhances the efficiency of processing. Also, since tasks are distributed properly according to the state of usage of the processors 32 of terminals 20, the designer of an application can design it without giving consideration to how tasks are to be distributed for processing.

The present invention has been described in conjunction with the exemplary embodiments. These exemplary embodiments are given solely by way of illustration. It will be understood by those skilled in the art that various modifications to the combination of each component and each process thereof are possible and that such modifications are also within the scope of the present invention.

In the foregoing embodiments, cases of distributing tasks to terminals 20 from the distributed processing management apparatus 80 have been described, but the embodiments are not limited to such cases only. For example, when a data processing apparatus is to execute an application containing a plurality of tasks, techniques described in the above embodiments are also applicable to cases where a task is distributed to another apparatus to utilize a resource available in the other apparatus or where a data processing apparatus to which a plurality of tasks have been distributed redistributes some of the distributed tasks to another apparatus. Even in such cases, tasks can be freely distributed to a plurality of apparatuses by automatically generating communication tasks and the apparatuses can execute the distributed tasks asynchronously when the environment is ready for the execution thereof, so that the efficiency of distributed processing can be far significantly enhanced.

INDUSTRIAL APPLICABILITY

The present invention is applicable to a distributed processing system in which tasks are processed in a distributed manner by a plurality of data processing apparatus interconnected by a network.

The invention claimed is:

1. A distributed processing system, comprising:
a plurality of data processing apparatuses;
a distributed processing management apparatus, connected to the plurality of data processing apparatuses via a network, which manages the plurality of data processing apparatuses in a distributed processing of an application by the plurality of data processing apparatuses,
the distributed processing management apparatus including:
a processing capacity information acquiring unit which acquires, from the plurality of data processing apparatuses, information on the respective processing capacities of the data processing apparatuses via the network;
an application information acquiring unit which acquires information on an application that includes a plurality of tasks to be processed by the data processing apparatuses, the information including an execution sequence of the plurality of tasks contained in the application and information on transfer of data between the tasks;

a task distributing unit which determines which of the plurality of tasks contained in the application are to be processed by which of the data processing apparatuses, based on the information on the respective processing capacities of the data processing apparatuses acquired by the processing capacity information acquiring unit;

a task transmitting unit which transmits tasks to a data processing apparatus determined by the task distributing unit; and a task information conveying unit which conveys information concerning a source apparatus of input data required by the respective task to the data processing apparatus executing the respective task, and the data processing apparatus including:
a task acquiring unit which acquires the task;
a task executing unit which executes the task;
a task information acquiring unit which acquires information concerning a source apparatus of data required by the task;
a communication task generator which generates a send task to make the source apparatus transmit data required by the task to the data processing apparatus, and transmits the send task to the source apparatus, when the source apparatus is another data processing apparatus, which is different from the data processing apparatus, connected to the data processing apparatus via the network; and
a send task executing unit which executes, if a send task is acquired from an apparatus executing a subsequent task, the send task and transmits the data required by the subsequent task to the apparatus executing the subsequent task.

2. The distributed processing system according to claim 1, wherein the communication task generator generates a receive task to allow the apparatus executing the task to receive the data transmitted from the source apparatus and generate input data of the task.

3. The distributed processing system according to claim 2, wherein when there are a plurality of source apparatuses, the communication task generator generates the send task for each of the plurality of source apparatuses and transmits the generated send tasks to the source apparatuses, and
wherein the receive task receives data transmitted from the plurality of source apparatuses and generates the input data.

4. The distributed processing system according to claim 2, wherein the receive task adjusts the timing for inputting the input data generated from the data received from the source apparatus.

5. The distributed processing system according to claim 2, wherein the receive task generates the input data by converting the data received from the source apparatus into a data format compatible with an input interface of the task.

6. The distributed processing system according to claim 2, the data processing apparatus further comprising:
a receive task executing unit which executes the receive task and transfers the input data, generated from the data received from the source apparatus, to the task executing unit.

7. The distributed processing system according to claim 6, wherein the task executing unit includes:
an input buffer which stores input data of the task; and
an output buffer which stores output data of the task, wherein the receive task executing unit transfers the input data to the input buffer.

8. The distributed processing system according to claim 1, wherein the send task selects necessary data from among data stored in the source apparatus and transmits the selected data.

9. The distributed processing system according to claim 1, wherein a communication parameter is set in advance for the send task according to a processing capacity of the source apparatus or the apparatus executing the task or content of the data required by the task.

10. The distributed processing system according to claim 1, wherein the application information acquiring unit acquires the information on an application by parsing a document including the information described in the markup language.

11. The distributed processing system according to claim 1, wherein the task is so designed as to be executable within the processing capacity of a single apparatus executing the task.

12. A distributed processing system, comprising:
a plurality of data processing apparatuses;
a distributed processing management apparatus, connected to the plurality of data processing apparatuses via a network, which manages the plurality of data processing apparatuses in a distributed processing of an application by the plurality of data processing apparatuses,
the distributed processing management apparatus including:
a processing capacity information acquiring unit which acquires, from the plurality of data processing apparatuses, information on the respective processing capacities of the data processing apparatuses via the network;
an application information acquiring unit which acquires information on an application that includes a plurality of tasks to be processed by the data processing apparatuses, the information including an execution sequence of the plurality of tasks contained in the application and information on transfer of data between the tasks;
a task distributing unit which determines which of the plurality of tasks contained in the application are to be processed by which of the data processing apparatuses, based on the information on the respective processing capacities of the data processing apparatuses acquired by the processing capacity information acquiring unit;
a task transmitting unit which transmits tasks to a data processing apparatus determined by the task distributing unit; and
a communication task generator which generates a send task to make a source apparatus of data required by the task transmit the data required by the task to an apparatus executing the task, and transmits the send task to the source apparatus, when the source apparatus is another apparatus, which is different from the apparatus executing the task, connected to the apparatus executing the task via a network, and
the data processing apparatus including:
a task acquiring unit which acquires the task;
a task executing unit which executes the task; and
a send task executing unit which executes, if a send task is acquired from the distributed processing management apparatus, the send task and transmits the data required by a subsequent task to the apparatus executing the subsequent task.

13. A data processing method, comprising:
acquiring, from a plurality of data processing apparatuses, information on the respective processing capacities of the data processing apparatuses via a network, when a distributed processing of an application is performed by the plurality of data processing apparatuses;

acquiring information on the application that includes a plurality of tasks to be processed by the data processing apparatuses, the information including an execution sequence of the plurality of tasks contained in the application and information on transfer of data between the tasks;

determining which of the plurality of tasks contained in the application are to be processed by which of the data processing apparatuses, based on the information on the respective processing capacities of the data processing apparatuses acquired;

transmitting tasks to a data processing apparatus determined; and generating a send task to make a source apparatus of data required by the task transmit the data required by the task to an apparatus executing the task and transmitting the send task to the source apparatus, when the source apparatus is another apparatus, which is different from the apparatus executing the task, connected to the apparatus executing the task via a network.

14. A computer program product for processing data, embedded on a non-transitory computer-readable recording medium, the product comprising:

a first acquiring module which acquires, from a plurality of data processing apparatuses, information on the respective processing capacities of the data processing apparatuses via a network, when a distributed processing of an application is performed by the plurality of data processing apparatuses;

a second acquiring module which acquires information on the application that includes a plurality of tasks to be processed by the data processing apparatuses, the information including an execution sequence of the plurality of tasks contained in the application and information on transfer of data between the tasks;

a determining module which determines which of the plurality of tasks contained in the application are to be processed by which of the data processing apparatuses, based on the information on the respective processing capacities of the data processing apparatuses acquired;

a transmitting module which transmits tasks to a data processing apparatus determined; and a generating module which generates a send task to make a source apparatus of data required by the task transmit the data required by the task to an apparatus executing the task, and transmits the send task to the source apparatus, when the source apparatus is another apparatus, which is different from the apparatus executing the task, connected to the apparatus executing the task via a network.

15. A distributed processing management apparatus, comprising:

a processing capacity information acquiring unit which acquires, from a plurality of data processing apparatuses, information on the respective processing capacities of the data processing apparatuses via a network, when a distributed processing of an application is performed by the plurality of data processing apparatuses;

an application information acquiring unit which acquires information on the application that includes a plurality of tasks to be processed by the data processing apparatuses, the information including an execution sequence of the plurality of tasks contained in the application and information on transfer of data between the tasks;

a task distributing unit which determines which of the plurality of tasks contained in the application are to be processed by which of the data processing apparatuses, based on the information on the respective processing capacities of the data processing apparatuses acquired;

a task transmitting unit which transmits the task to the data processing apparatus determined; and a communication task generator which generates a send task to make a source apparatus of data required by the task transmit the data required by the task to an apparatus executing the task, and transmits the send task to the source apparatus, when the source apparatus is another apparatus, which is different from the apparatus executing the task, connected to the apparatus executing the task via a network.

* * * * *